United States Patent
Mori et al.

[11] Patent Number: 5,559,179
[45] Date of Patent: Sep. 24, 1996

[54] MOLDING COMPOUND

[75] Inventors: Shinji Mori, Koriyama; Katsutoshi Ishioka, Fukushima, both of Japan

[73] Assignee: NOK Corporation, Tokyo, Japan

[21] Appl. No.: 339,201

[22] Filed: Nov. 10, 1994

[51] Int. Cl.$^6$ ............................ C08L 81/04; C08L 61/04
[52] U.S. Cl. .......................... 524/494; 524/594; 524/595; 524/609
[58] Field of Search ...................... 524/494, 594, 524/595, 609

[56] References Cited

U.S. PATENT DOCUMENTS 5,179,145  1/1993  Wright ................................. 524/147
5,185,195  2/1993  Harpell ................................ 428/102

FOREIGN PATENT DOCUMENTS 5311036  11/1993  Japan.

OTHER PUBLICATIONS

Translation of Japan 5–311036, Nov. 22, 1993.

*Primary Examiner*—Vasu S. Jagannathan
*Attorney, Agent, or Firm*—Barnes & Thornburg

[57] ABSTRACT

A molding compound which comprises phenol resin or polyphenylenesulfide resin, chopped strands of glass fibers and powdery glass fibers having a length of about 10 to about 200 μm is used suitably for molding a resin stator having an insert molded or post-inserted metallic outer race.

25 Claims, No Drawings

MOLDING COMPOUND

BACKGROUND OF THE INVENTION

1. Field of the Invention

The present invention relates to a molding compound, and more particularly to a molding compound comprising resin and fibrous materials.

2. Description of the Prior Art

It is the conventional practice to mix phenol resin as a molding material with chopped strands of such fibrous materials as glass fibers, carbon fibers, aramid fibers or the like, cut to a length of 1.5 to 6 mm, thereby improving the strength of molded articles.

Molded articles can be produced by injection molding, transfer molding or the like, for example, by melting a compound and passing the molten compound through a mold cavity. When there is an obstacle such as a pin, an insert or the like in the mold cavity, or when the molding is carried out by multigating, the molten resin behaves in such manner that one flowing molten resin stream is separated into a plurality of substreams at the forward end of the stream once and then joined together, and thus occurrence of weld lines is inevitable.

The strength along the weld lines formed by molding the conventional compound, particularly the strength against the tensile stress in the direction perpendicular to the weld lines is very low. Phenol resin compounds containing chopped strands are not exceptional.

Since the polyphenylenesulfide resin has good heat resistance, chemical resistance, dimensional stability, electrical insulation, etc., it is used in many fields including electrical or electronic fields and automobile field. However, in molding of the resin into products of complicated shapes by injection molding, transfer molding or the like, generation of weld lines is inevitable as in the case of phenol resin, and thus an improvement of the strength against the weld lines has been so far desired.

SUMMARY OF THE INVENTION

An object of the present invention is to provide a molding compound containing chopped strands of glass fibers, and its molded articles having an improved strength in weld regions.

According to the present invention, there is provided a molding compound, which comprises phenol resin or polyphenylenesulfide resin, chopped strands of glass fibers and powdery glass fibers having a length of about 10 to about 200 μm.

DETAILED DESCRIPTION OF THE INVENTION

Phenol resin for use in the present invention includes novolak resin and resol resin, where novolak resin is preferable. Novolak resin having a weight average molecular weight of about 1,000 to about 5,000 is particularly preferable. Below abut 1,000, the flowability is so high that there is a fear of generation of a large amount of burrs or occurrence of burn marks due to gas generation during molding, whereas above about 5,000 the flowability is so low that molding is generally hard to carry out.

A curing agent such as hexamethylenetetramine, etc. is added to the phenol resin. That is, preferably about 10 to about 30 parts by weight of the curing agent is added to 100 parts by weight of the phenol resin.

The polyphenylenesulfide resin includes various types such as cross-linking type, partial cross-linking type and linear type, among which the cross-linking type belongs to the polymers of lowest molecular weight and the linear type to those of highest molecular weight. A specific melt viscosity is required for the molding materials. In the case of crosslinking type and partial cross-linking type a required specific melt viscosity can be obtained by oxygen crosslinking through heat treatment, whereas in the case of linear type the polymers themselves have such a melt viscosity necessary for satisfactory molding from the beginning without carrying out such heat treatment. Such linear polyphenylenesulfide resin of molding grade are commercially available from Phillips Petroleum Company, and such commercial available resins per se can be used in the present invention.

Chopped strands of glass fibers for use in the present invention are strands each of about 1,000 to about 30,000 of glass fibers having a fiber diameter of 6 to 30 μm, bundled by a binder such as epoxy resin, vinyl acetate resin, etc. and cut to a length of 1.5 to 6 mm. About 5 to about 150 parts by weight, preferably about 40 to about 110 parts by weight, of the chopped strands of glass fibers are used per 100 parts by weight of the phenol resin in the same manner as so far used. Or, about 5 to 200 parts, preferably about 40 to about 100 parts by weight of the chopped strands of glass fibers are used per 100 parts by weight of the polyphenylenesulfide resin.

Powdery glass fibers having a length of about 10 to about 200 μm for use in the present invention are those prepared by grinding glass fibers having a fiber diameter of 6 to 30 μm to the specific length of about 10 to about 200μm in a grinder or the like. About 50 to about 200 parts by weight, preferably about 60 to about 160 parts by weight, of the powdery glass fibers are used per 100 parts by weight of the phenol resin. Or, about 15 to about 200 parts by weight, preferably about 40 to about 160 parts by weight, of the powdery glass fibers are used per 100 parts by weight of the polyphenylenesulfide resin. When the length of the powdery glass fibers is less than about 10 μm, the overall strength will be lowered, whereas above about 200 μm the strength in the weld regious will not be improved. Below about 50 parts by weight the desired improvement of the strength in the weld regious will not be obtained, whereas above abut 200 parts by weight the blendability is deteriorated, though the strength in the weld regious can be increased.

It is possible to use chopped strands and powder of carbon fibers, aramid fibers, etc. in place of the chopped strands and powder of the glass fibers, but the chopped strands and powder of glass fibers are preferable from the viewpoints of strength of molded articles and cost. Chopped strands and powders of carbon fibers, aramid fibers, etc. can be used together with those of glass fibers, so far as there is no adverse effect.

Besides the foregoing components it is also possible to use a silane-based, titanate-based or aluminum-based coupling agent for improving the bonding between the phenol resin or polyphenylenesulfide resin and the glass fibers, a coloring agent, a curing promoter, a mold release agent, etc. when desired.

A compound can be prepared by kneading the above-mentioned components in a double roll or the like and grinding the kneaded blend in a mill grinder or the like after cooling. The thus prepared compound is subjected to injection molding, transfer molding, or the like.

Molding compound comprising phenol resin or polyphenylenesulfide resin and chopped strands of glass fibers can be effectively used in the molding of stators for use in automatic speed regulators with an improved resistance to cracking.

The stater made from phenol resin or polyphenylenesulfide resin can be produced by insert-molding or post-inserting a metallic outer race at the inner peripheral region requiring a dimensional precision, where the phenol resin is molded usually at a mold temperature of about 70° to about 110° C. or polyphenylenesulfide resin is molded usually at a mold temperature of abut 300° to about 360° C. In the course of cooling after the molding an internal stress is accumulated in the stator body due to a difference in the coefficient of thermal expansion between the molded phenol resin or polyphenylenesulfide resin and the metal. The internal stress of the stator body is further increased due to further shrinkage of molded phenol resin or molded polyphenylenesulfide resin when exposed to a high temperature circumstance in the actual application. To reduce the internal stress, an inorganic filler is added to the phenol resin or polyphenylenesulfide resin. Usually, chopped strands of glass fibers having a length of about 1.5 to about 6mm are used as the inorganic filler from the viewpoints of strength, heat resistance, cost, etc.

A notch or an oil hole must be provided on the inner peripheral surface of the stator body as a passage for lubricating a one-way clutch mounted on the inner pheriphery of the outer race, and the internal stress is liable to be concentrated particularly around the notch or oil hole. Furthermore, when the notch or oil hole is formed during the molding, the weld regions are inevitably formed around the notch or oil hole and cracks are liable to be generated thereby.

By replacing a portion of chopped strands of glass fibers with powdery glass fibers having a length of about 10 to about 200 μm, generation of cracks in the stator made from phenol resin or polyphenylenesulfide resin can be made substantially zero after the molding or even after being left in a high temperature circumstance for a long time.

That is, by further adding powdery glass fibers having a length of abut 10 to about 200 μm to a molding compound comprising phenol resin or polyphenylenesulfide resin and chopped strands of glass fibers, the strength in the weld regions of molded articles produced by injection molding, transfer molding, or the like can be increased. Thus, the molded articles having weld regions obtained from the present molding compound have a distinguished durability even when used in a high load state or a thermal stress-susceptible circumstance.

Molded articles having weld regions inserted with a metal or the like, such as stators made from phenol resin for use in automatic speed regulators, obtained from the present molding compound, have a good resistance to cracking.

PREFERRED EMBODIMENTS OF THE INVENTION

The present invention will be described in detail below, referring to Examples and Comparative Examples.

Examples 1 to 4 and Comparative Examples 1 to 2

Predetermined parts by weight of chopped strands of glass fibers (a fiber diameter of 13 μm and an average fiber length of 3 mm) and powdery glass fibers (a fiber diameter of 11 μm and an average fiber length of 70 μm), and 10 parts by weight in total of additives such as an aminosilane-based coupling agent, a coloring agent, a mold release agent, etc. were added to 100 parts by weight of novolak phenol resin containing 20% by weight of hexamethylenetetramine and mixed therewith. Then, the resulting mixture was kneaded through a double roll with a high temperature side of 120° C. and a low temperature side of 80° C. After cooling, the kneaded mixture was ground in a mill grinder to obtain phenol resin compounds. Good roll kneadability was obtained in all of Examples 1 to 4 and Comparative Examples 1 except Comparative Example 2 where there was much falling of the mixture from between the roll.

The thus obtained phenol resin compounds were formed into test pieces in the shape according to ASTM D-638, Type I by injection molding at a cylinder temperature of 90° C., a mold temperature 175° C. and an injection pressure of 800 kgf/cm$^2$ for an injection time of 30 seconds and a curing time of 30 seconds.

Test pieces for determining a tensile strength in the weld region were prepared by introducing the molten compound from both ends of the mold, whereas test pieces for determining a tensile strength in the normal region were prepared by introducing the molten compound from one end of the mold. Drawing tests for determining the tensile strength were carried out according to ASTM D-638.

Results of determination are given in Table 1 together with the amounts of chopped strands and powder of glass fibers.

TABLE 1

| | Comp. Ex. 1 | Ex. 1 | Ex. 2 | Ex. 3 | Ex. 4 | Comp. Ex. 2 |
|---|---|---|---|---|---|---|
| [Glass fibers; parts by weight] | | | | | | |
| Chopped strands | 170 | 110 | 85 | 60 | 40 | 0 |
| Powders | 0 | 60 | 85 | 110 | 160 | 170 |
| [Tensile strength; kgf/cm$^2$] | | | | | | |
| Weld region (A) | 5.5 | 7.5 | 8.3 | 8.4 | 10.0 | — |
| Normal region (B) | 14.2 | 13.4 | 14.0 | 13.8 | 14.9 | — |
| A/B ratio | 0.39 | 0.56 | 0.59 | 0.61 | 0.67 | — |

Example 5 and Comparative Examples 3 to 4

Stators made from phenol resin having an insert molded metallic outer race were produced from phenol resin compounds having compositions given in Table 2, and number of cracks generated after molding was counted for 30 samples and number of cracks was also counted for the samples having no cracks by leaving the samples having no cracks to stay in a thermostat tank at 150° C. for 1,000 hours. Results are given in Table 2.

TABLE 2

|  | Ex. 5 | Comp. Ex. 3 | Comp. Ex. 4 |
| --- | --- | --- | --- |
| [Phenol resin compound; parts by weight] | | | |
| Hexamethylenetetramine-containing novolak phenol resin | 35 | 40 | 35 |
| Chopped strands of glass fibers (length: 3 mm) | 40 | 55 | 30 |
| Powdery glass fibers (average fiber length: 70 μm) | 20 | — | — |
| Aluminum silicate powder (average particle size: 5 μm) | — | — | 30 |
| Other additives such as mold release agent, coloring agent, etc. | 5 | 5 | 5 |
| [Number of cracks generated in stators] | | | |
| After molding | 0/30 | 1/30 | 16/30 |
| After being left at 150° C. for 1,000 hours | 0/30 | 3/29 | 14/14 |

Examples 6 to 8 and Comparative Examples 5 to 6

100 parts by weight of linear polyphenylenesulfide resin (weight average molecular weight: 64,900) was mixed with predetermined amounts of chopped strands of glass fibers (a fiber diameter of 13 μm and an average fiber length of 3 mm) and powder of glass fibers (a fiber diameter of 11 μm and an average fiber length of 70 μm), followed by mixing in a blender. The resulting mixture was kneaded at a temperature of 290° to 340° C. in a biaxial kneader-extruder to obtain pellets of molding material.

The thus obtained polyphenylenesulfide resin compounds were formed into test pieces in the shape according to ASTM D-638, Typr I by injection molding at a cylinder temperature of 310° to 340° C., a mold temperature 140° C. and an injection pressure of 800 kgf/cm².

Test pieces for determining the tensile strength and elongation at the welded part were prepared as test pieces of shape according to ASTM D-638, Typr I by pouring the molten molding material into the mold from both ends thereof.

Results of determination are shown in Table 3 together with parts by weight of chopped strands and powder of glass fibers.

TABLE 3

|  | Comp. Ex. 5 | Ex. 6 | Ex. 7 | Ex. 8 | Comp. Ex. 6 |
| --- | --- | --- | --- | --- | --- |
| [Glass fibers; parts by weight] | | | | | |
| Chopped strands | 186 | 143 | 93 | 43 | — |
| Powders | — | 43 | 93 | 143 | 186 |
| [Results of determination at the welded part] | | | | | |
| Tensile strength (MPa) | 60 | 60 | 62 | 61 | 57 |
| Elongation (%) | 0.48 | 0.56 | 0.60 | 0.62 | 0.52 |

What is claimed is:

1. A molding compound which comprises polyphenylenesulfide resin, chopped strands of glass fibers and powdery glass fibers having a length of about 10 to about 200 μm.

2. A molding compound according to claim 1, wherein the chopped strands of glass fibers are glass fibers having a fiber diameter of 6 to 30 μm, bundled with a resin binder and cut to a length of 1.5 to 6 mm.

3. A molding compound according to claim 1, wherein about 5 to about 200 parts by weight of the chopped strands of glass fibers are used per 100 parts by weight of the polyphenylenesulfide resin.

4. A molding compound according to claim 1, wherein about 15 to about 200 parts by weight of the powdery glass fibers having a length of about 10 to about 200 μm were used per 100 parts by weight of the polyphenylenesulfide resin.

5. A molding compound according to claim 1, wherein chopped strands or powder of carbon fibers or aramid fibers are used together with the chopped strands of glass fibers and the powdery glass fibers.

6. A molding compound according to claim 1, where a coupling agent is further contained.

7. A molded article having a weld region and being molded from a molding compound which comprises:
   polyphenylenesulfide resin,
   chopped strands of glass fibers, and
   powdery glass fibers having a length of about 10 to 200μm.

8. A molded article according to claim 7, wherein the molded article is a stator made from polyphenylenesulfide resin having an insert molded or post-inserted metallic outer race.

9. A molded article according to claim 7, wherein the chopped glass fibers are glass fibers having a fiber diameter of 6 to 30μ and are bundled with a resin binder and have a length of 1.5 to 6 μm.

10. A molded article according to claim 7, wherein about 5 to 200 parts by weight of the chopped strands of glass fibers are used per 100 parts by weight of the polyphenylenesulfide resin.

11. A molded article according to claim 7, wherein about 15 to about 200 parts by weight of the powdery glass fibers are used per 100 parts by weight of the polyphenylenesulfide resin.

12. A molded article according to claim 7, wherein chopped strands or powdery carbon fibers or aramid fibers are used together with the chopped strands of glass fibers and the powder glass fibers.

13. A molded article according to claim 7, wherein a coupling agent is included which assists in bonding the polyphenylenesulfide resin to the chopped strands of glass fibers and the powdery glass fibers.

14. A molding compound which comprises phenol resin, a curing agent for the phenol resin, chopped strands of glass fibers and powdery glass fibers having a length of about 10 to about 200 μm.

15. A molding compound according to claim 14, wherein the phenol resin is a novolak phenol resin or a resol phenol resin.

16. A molding compound according to claim 15, wherein the novolak phenol resin has a weight average molecular weight of about 1,000 to about 5,000.

17. A molding compound according to claim 14, wherein the curing agent for the phenol resin in hexamethylenetetramine.

18. A molding compound according to claim 17, wherein about 10 to about 30 parts by weight of the hexamethylenetetramine is used per 100 parts by weight of the phenol resin.

19. A molding compound according to claim 14, wherein the chopped strands of glass fibers are glass fibers having a fiber diameter of 6 to 30 μm, bundled with a resin binder and cut to a length of 1.5 to 6 mm.

20. A molding compound according to claim 14, wherein about 5 to about 150 parts by weight of the chopped strands of glass fibers are used per 100 parts by weight of the phenol resin.

21. A molding compound according to claim 14, wherein about 50 to about 200 parts by weight of the powdery glass fibers having a length of about 10 to about 200 μm were used per 100 parts by weight of the phenol resin.

22. A molding compound according to claim 14, wherein chopped strands or powder of carbon fibers or aramid fibers are used together with the chopped strands of glass fibers and the powdery glass fibers.

23. A molding compound according to claim 14, where a coupling agent is further contained.

24. A molding molded article having a weld region, molded from a molding compound which comprises phenol resin, a curing agent for the phenol resin, chopped strands of glass fibers and powdery glass fibers having a length of about 10 to about 200 μm.

25. A molding molded article according to claim 24, wherein the phenol resin molded article having a weld region is a stator made from phenol resin having an insert molded or post-inserted metallic outer race.

* * * * *